United States Patent [19]

Pagane

[11] 4,412,204
[45] Oct. 25, 1983

[54] FUEL LEVEL MONITORING AND ENGINE CONTROL DEVICE

[76] Inventor: Warren H. Pagane, 16 Forbes Hill Rd., Wallaston, Mass. 02170

[21] Appl. No.: 303,586

[22] Filed: Sep. 18, 1981

Related U.S. Application Data

[63] Continuation-in-part of Ser. No. 48,025, Jun. 13, 1979, and Ser. No. 63,276, Aug. 2, 1979, which is a continuation of Ser. No. 925,473, Jul. 17, 1978, abandoned.

[51] Int. Cl.³ .................. B60Q 5/00; G08B 21/00
[52] U.S. Cl. ............................ 340/59; 180/287; 307/10 R; 307/10 AT; 340/64
[58] Field of Search .............. 340/59, 63, 64, 618; 307/10 R, 10 AT; 180/287

[56] References Cited

U.S. PATENT DOCUMENTS

| | | | |
|---|---|---|---|
| 2,700,153 | 1/1955 | Huckabee | 340/59 X |
| 3,623,043 | 11/1971 | Bozoian | 340/59 X |
| 3,739,337 | 6/1973 | Hill | 340/618 X |
| 3,792,456 | 2/1974 | Hill | 340/59 X |
| 3,886,518 | 5/1975 | Bozoian | 340/59 |
| 3,914,735 | 10/1975 | Guillaume | 307/10 R X |
| 3,938,117 | 2/1976 | Bozoian | 340/59 X |
| 3,939,471 | 2/1976 | Momberg | 340/59 |
| 4,001,676 | 1/1977 | Hile et al. | 340/59 X |
| 4,010,444 | 3/1977 | Shah | 340/59 X |

Primary Examiner—Glen R. Swann, III
Attorney, Agent, or Firm—W. Patrick Quast

[57] ABSTRACT

An electronic fuel level monitoring and engine control device which senses the voltage level from a fuel gauge-tank sender unit, providing initially an intermittent warning for a predetermined time delay and later a shut-off of the engine ignition and or starter system when the voltage level indicates a predetermined low level of fuel. The ignition and or starter system is reactivated only after refueling above an upper level.

8 Claims, 3 Drawing Figures

FUEL LEVEL MONITORING AND ENGINE CONTROL

FUEL LEVEL MONITORING AND ENGINE CONTROL DEVICE

This application is a continuation-in-part of application Ser. No. 48,025 filed June 13, 1979, and Ser. No. 63,276 filed Aug. 2, 1979, the latter representing a continuation application of Ser. No. 925,473, filed July 17, 1978, and now abandoned.

BACKGROUND OF THE INVENTION

1. Field of the Invention

This invention pertains to an electronic fuel level monitoring and engine control device which is connected to a vehicle's electric fuel gauge, furnishes a warning signal when the level of fuel in the tank is low and deactivates the ignition and starter systems of the vehicle or the boiler when the fuel level reaches a predetermined low level but before the tank is empty.

2. Description of the Prior Art

Devices which warn of low fuel levels in fuel tanks are well known in the prior art. Typically they are connected to the fuel gauge and have been used in motor vehicles, aircraft, boats and oftentimes to monitor fuel tanks for boilers and heating systems. Many of these devices include either a visible or audible warning signal or both to indicate the low fuel level. In these prior art devices, however, if the operator does not refuel, the engine will continue to operate until the tank is empty. Besides the obvious inconvenience of allowing a fuel tank to become empty, damage to the equipment can occur.

The problem of a fueled apparatus being forced to shut down by an empty fuel tank is particularly acute when it involves off-the-road equipment or construction vehicles. Not only must the tank be refilled but a restart procedure, including priming the engine (particularly diesel powered units), refilling the fuel filter and cranking the engine must be followed. This may often require calling a mechanic to the site.

The extensive cranking required in restarting also drains power from the battery, thus shortening the life of the battery by depleting its charge. Also premature starter motor failure can occur. The problems of restarting are particularly aggravated when environmental temperatures are at extremes.

Also, if the equipment should become inoperative due to an empty fuel tank and the ignition switch is left on, the ignition coil could overheat, the points burn out and the battery, eventually, fully discharge.

Further, a safety hazard may also be present. If the equipment is being operated on a steep incline or near a cliff, or hoisting a load when it runs out of fuel, the operator can lose control due to loss of power steering and power brakes. Accidents can and have happened under such circumstances.

Further, expense of equipment shutdown because of empty fuel tanks can be great. Operational time is lost and operating labor idled. As noted above, a mechanic may have to be called to restart the equipment. Mechanics are particularly hard to find at off-the-road construction and remote sites. Thus, the down time could be prohibitively long.

It is therefore a primary object of this invention to provide a device which eliminates the safety problems inherent in engine shutdown due to empty fuel tanks.

It is still another object of this invention to minimize the loss of operational time for equipment and manpower, and, thus, reduce the cost of the job to the contractor and customer.

It is yet another object of this invention to provide a device which has general application for practically all fuel driven systems.

And, it is still another object of this invention to provide a device which eliminates resulting equipment problems due to running out of fuel.

SUMMARY OF THE INVENTION

Toward the accomplishment of these and other objects which will become more apparent from a reading of the following and a studying of the accompanying drawings, there is disclosed an electronic, fuel level monitoring and engine control device which deactivates the ignition and starter systems of a liquid or gas fueled vehicle or boiler when the fuel in the tank reaches a predetermined low level. After the unit is refueled beyond a predetermined upper level, the ignition system is reactivated and the unit is ready to operate. It can operate with any fueled apparatus regardless of the type of fuel used—gasoline, oil, diesel, propane or other. As this level becomes low it gives a warning signal which may be visible or audible or both. Once the warning signal is activated, after a predetermined time delay, the device of the present invention will shut down the ignition system of the unit. This delay allows the operator time to position the unit properly whatever the reason, for example, to refuel; to raise or lower the unit's equipment or load to a safe level; to leave a steep incline or roadway; etc.

The delayed shutdown time can be fixed or variable, depending on equipment requirements and use. The use of a fixed delay time can eliminate tampering with the system.

Furthermore, the fuel level monitoring and engine control device of the present invention includes lockout means for preventing reactivation of the ignition system until the tank is refilled above a predetermined upper level thus minimizing repetitive refueling operations during daily operation of the unit.

More particularly, the fuel level monitoring and engine control device of the present invention includes a monitoring circuit which senses the voltage at the fuel gauge-tank unit juncture and feeds it to a voltage level sensing circuit. The voltage monitoring - voltage level sensing circuits may include two separate circuit arrangements, either of which are connected in circuit to accommodate the two, known, fuel gauge-tank unit arrangements on the market.

As stated, the monitoring circuit is connected in circuit to a voltage level sensor. When the fuel in the tank reaches the predetermined, safe low level, the voltage sensed by the monitoring circuit and fed to the level sensor causes the latter to change state. This transition gates an oscillator circuit whose frequency, typically, might be two cycles per second (2 cps).

The oscillator output is suitably connected through a drive circuit(s) to a warning device(s), causing the latter to pulsate at the oscillator rate.

The output of the voltage level sensor is also connected to a timing circuit. This provides the fixed or variable delay, typically, five minutes. After the prescribed time the output of the timing circuit changes state and deactivates the ignition and/or the starter systems of the vehicle through a relay drive circuit. Further, the output of the timing circuit is connected to the output of the oscillator circuit so that when the former changes state it clamps the output of the oscillator circuit at a fixed voltage level. This results in a constant, rather than pulsating, warning signal.

Self-test and lockout circuitry is provided which allows a momentary check of the operability of the device and which includes means for preventing reactivation of the ignition and starter system, etc., until a second, predetermined upper level of fuel is present in the tank.

When fuel is subsequently added, and the predetermined upper level is reached, the timing and oscillator circuits are deactivated allowing the unit to be restarted.

DESCRIPTION OF THE PREFERRED EMBODIMENT

Prior to a description of a preferred embodiment, an understanding of the standard fuel gauge systems may be helpful. The fuel level control device of the present invention responds to a voltage signal from a vehicle's electric fuel gauge system. The latter is comprised of a dial-type-gauge which is serially connected to a tank-mounted, float control potentiometer. Electrical power is supplied through the ignition switch from the vehicle's battery. Generally, potentiometer's resistance to ground varies by virtue of the movable brush connected to the tank unit float arm. Obviously, the float responds to the level of fuel in the tank.

There are basically two fuel gauge systems in use today. One system is typified by that manufactured by the A. C. Spark Plug Division of General Motors Corp. In this system with the lowering of the fuel, and hence the lowering of the float, the potentiometer's resistance to ground is reduced. This results in a decreasing voltage read at the juncture of the gauge and potentiometer for decreasing fuel. This will be referred to hereinafter as the "Nor." system.

The other system in use is illustrated by the Stewart & Warner Company's arrangement. Here, the lowering of the fuel level (again, with a lowering of the float) increases the potentiometer's resistance to ground, resulting in an increasing voltage at the juncture of the gauge and potentiometer for decreasing fuel. This will be referred to hereinafter as the "Rev." system. The fuel level engine control device described hereinafter is designed to operate with either gauge system.

Figure 1:
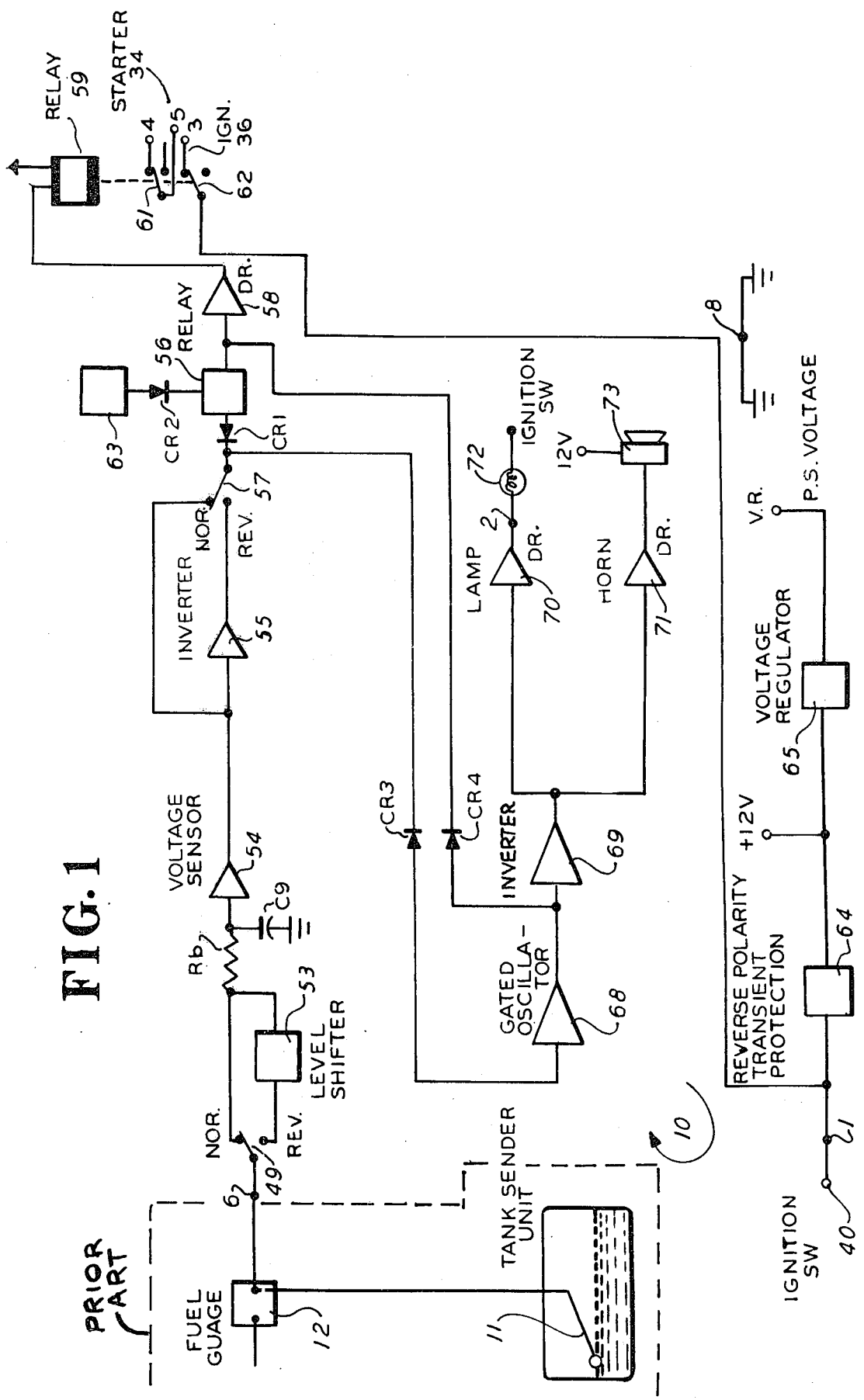
FIG. 1 is a block diagram of the electrical circuit for the fuel level monitoring and engine control device of the present invention.

Referring now to the drawings, the preferred embodiment of the fuel level monitoring and engine control device of the present invention is illustrated in FIG. 1, and is designated generally by the reference number 10. Device 10 is wired to the fuel gauge-tank sending unit (potentiometer), 12-11, of the vehicle, from which the fuel level signal is applied to a voltage sensor 54, either directly through switch 49 for a fuel gauge system reading a low fuel level with a low voltage ("Nor.") or through switch 49 to a voltage level shifter 53, for example, a zener diode, for fuel systems reading a low fuel level with a high voltage ("Rev."). R6 and C9 provide a low pass filter which eliminates transient effects due to sloshing of the fuel in the tank. Device 10 allows a single voltage level sensor 54 with fixed trip points to be compatible with all known fuel gauge systems in use. Voltage level sensor, 54, typically would be a Schmitt trigger with threshold voltages compatible with the voltages anticipated at the fuel gauge —sender unit for the predetermined upper and lower levels of fuel at which the control device is to function. Motorola Semiconductor Corp.'s MC14584BCP is an I.C. device which includes six such circuits. The remaining circuits are used throughout the circuitry and will be identified appropriately.

The output signal of the voltage level sensor 54 is fed either directly through switch 57 or through an inverter 44 and switch 57 to a time delay circuit 56 and a gated oscillator 68. Inverter 55 and portions of the delay circuit 56 and oscillator circuit 68 can include corresponding ones of the six Schmitt trigger circuits contained in the I.C. device described above. When the output signal of the voltage level sensor 54 changes state indicative of a low fuel condition, the time delay circuit 56 is activated and begins its timing function. Simultaneously, the gated oscillator 68 is enabled and provides a pulsating signal through inverter 69 to the audible alarm driver 71 and audible alarm 73 and/or a visual alarm driver 70 with visual indicator 72.

The output of the time delay circuit is connected to a relay drive circuit 58 which in turn operates relay 59. The latter in a normal fuel condition is energized. This allows the starter and ignition circuits to function through the relay contacts 61 and 62. The latter as shown in FIG. 1, are for a normal fuel condition, i.e., the relay 59 energized.

When the time delay circuit 56 has reached its predetermined delay time (typically five minutes), its output signal changes and cuts off relay driver 58 and, in turn, de-energizes the output relay 59. The starter and ignition circuits are thus deactivated.

Also, at the termination of the predetermined time delay, the change in output of the delay circuit, through diode CR 4, clamps the oscillator output and changes the pulsating alarms to constant indicators.

The relay drive circuit 58 and the lamp and horn drive circuits 70 and 71, typically, would be bipolar, darlington drivers. The three circuits are available, as part of a second I.C. circuit, Fairchild Semiconductor Co.'s Part No. 9668PC which includes seven such circuits.

The engine is now disabled and cannot be restarted through any possible combination or manipulation of the ignition or starter switches. Any attempt to restart the engine will always result in a steady alarm condition for both the visual and audible alarms 72, 73.

Figure 2:
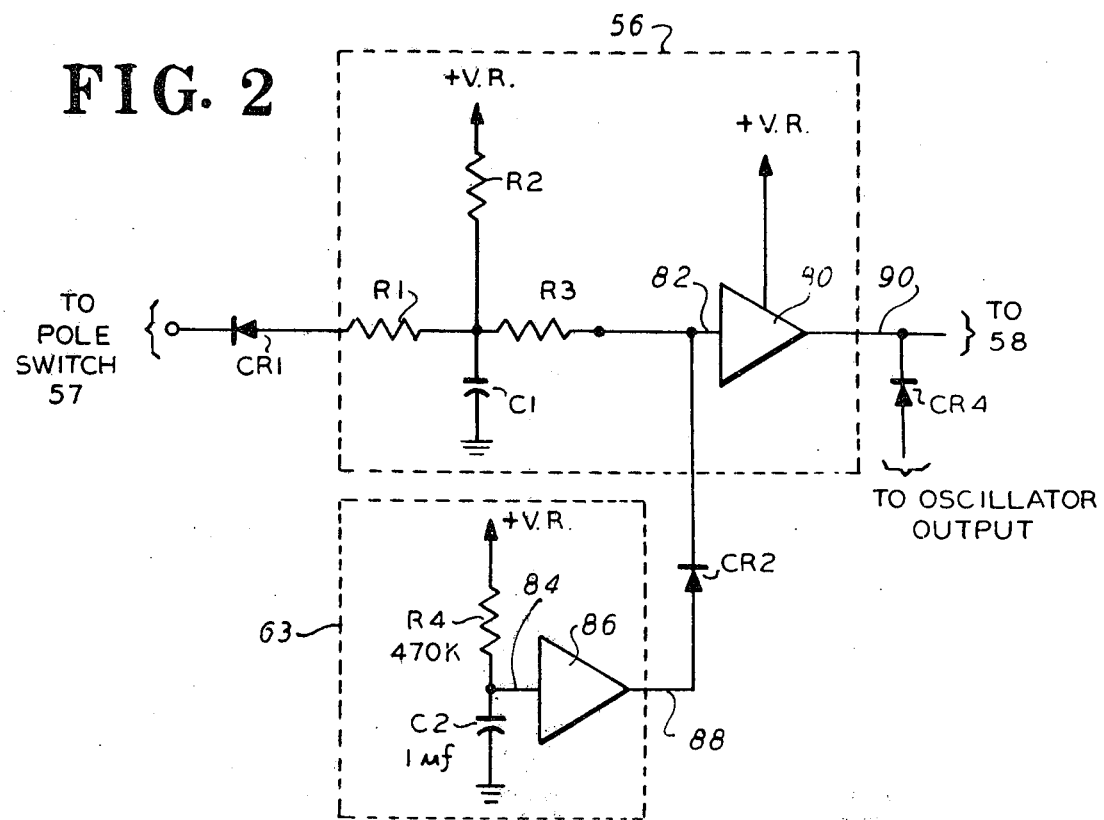
FIG. 2 is a schematic diagram of the timer, self-test and lockout portions of the block diagram of FIG. 1.

The circuit which precludes engine restart in a low fuel condition is identified as the "selftest and lockout" circuit, 63. This is connected to the time delay circuit 56 through diode CR2. The interaction of these two circuits is best understood from a consideration of FIG. 2.

Presuming a low fuel condition, regardless of the type fuel gauge-sender unit system employed, the voltage at the cathode of CR1 (pole of switch 57) is a positive voltage level indicating the changed state of sensor 54. Before Schmitt trigger 80 can change state (indicating low fuel), the voltage at its input lead 82 must reach the threshold level of the device.

The normal time delay associated with the time delay circuit (five min.) is controlled by the RC circuit formed by R2 and C1. Typical values would be 10 megohms and 39 microfarads. At turn on, therefore, unless some way were available to bypass this time delay, the vehicle could be started and run for five minutes (or whatever the delay) before it would shut down again. Circuit 63 overcomes this. At start up, input 84 to Schmitt trigger 86 is initially at ground potential because C2 instantaneously is a short to ground. Output lead 88, thus, is at a "high" level which is impressed on the input lead 82 of Schmitt Trigger 80, and charges capacitor C1 through resistor R3 (typically 1000 ohms).

Capacitor C2 (typically one microfarod) charges through R4 (470 K ohms) reaching the threshold level of Schmitt trigger 86. This might take approximately one second. At this time the output 88 goes to a low voltage level. However, the voltage at 82 is maintained at the high level because of the charged capacitor C1. This results in a continuing low voltage level at lead 90 (output of time delay circuit) which maintains the relay 59 de-energized through driver 58. The vehicle cannot be restarted.

When a sufficient amount of fuel has been added, after a brief (typically a sec.) selftest mode, provided by circuit 63, the engine can be restarted. This occurs as follows: The voltage level at the cathode of CR1 is now low. Output 88 of trigger 86, again, initially is at a high level and is supplied to input lead 82, forcing trigger 80 to have a low output state. Relay 59 cannot be energized. After C2 charges to the threshold level of 86, the output level on 88 again goes low, but this time, because the cathode of CR1 is at a low voltage level, C1 discharges through R1 (typically 1000 ohms). Thus the high level at input 82 cannot be maintained and the relay is quickly (the one sec.) energized allowing engine restart. During this one second period it can be seen, however, the alarm system functions as if there were a low fuel condition. The activation of the alarms 72 and 73 provide a positive indication to the operator that the monitoring device is functioning.

Simultaneously, with sufficient fuel the gated oscillator 68 is disabled (low voltage at CR3 cathode), whereby deactivating the low fuel warning alarms 72, 73, except for the one second test mode.

All operating power for device 10 is derived from the engine starting battery through ignition switch 40 and the internal power supply voltage for the electronic circuits is regulated by voltage regulator 65 to provide an operating voltage, V.R., independent of actual battery voltage. In addition, polarity and transient protection circuits 64 of known design are provided.

Figure 3:
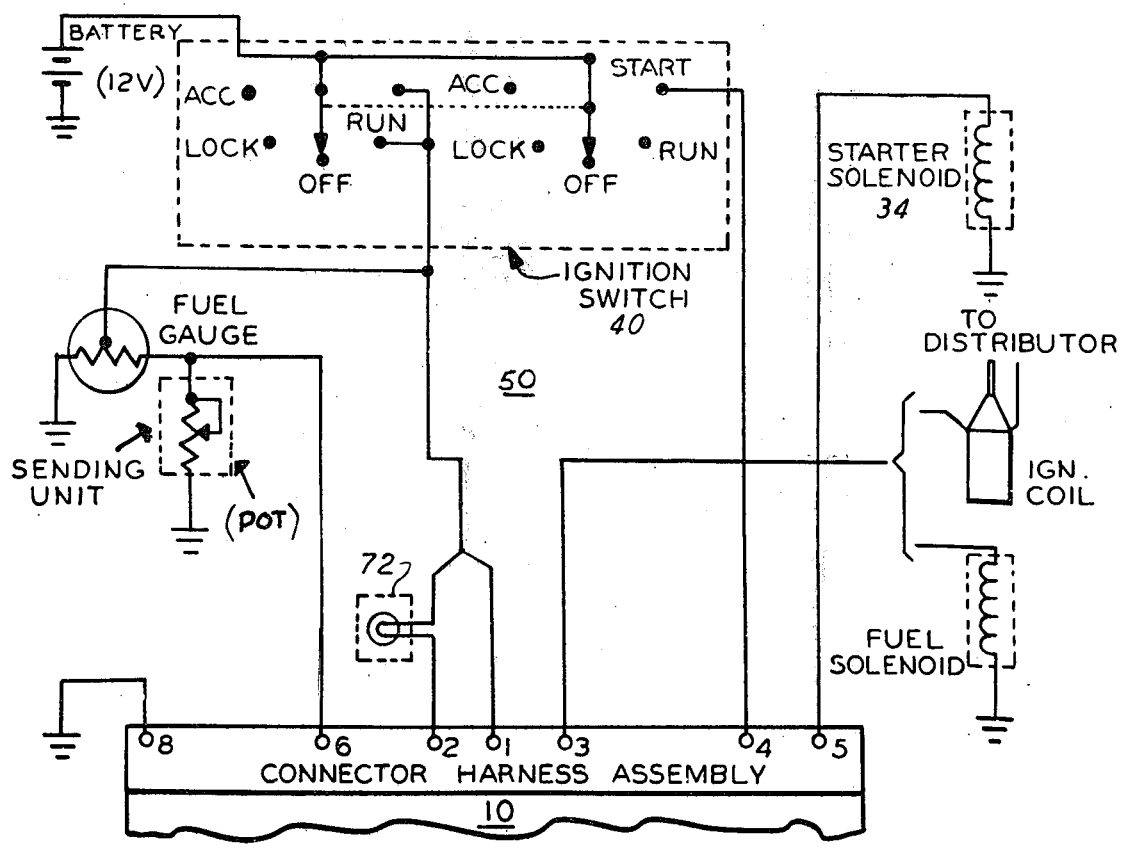
FIG. 3 is a wiring diagram of the connections of the circuit of FIG. 1 to a vehicle electrical circuit.

Referring to FIG. 3, this circuit shows how device 10 is connected to the electrical system 50 of the equipment. Terminals 1 through 8 correspond to the identical numbers in FIG. 1. Terminal 1 is connected to the run side of the ignition switch 40. This will supply current to the device 10 when ignition switch 40 is closed. Terminal 2 is connected to warning light 72 the other side of which returns to the run side of ignition switch 40. Terminal 3 is connected to the ignition coil or fuel solenoid, depending on whether it is a gasoline fueled or diesel fueled engine. Terminal 4 is connected to the start terminal of ignition switch 40. Terminal 5 is connected to the starter solenoid 34. Terminal 6 is connected to the junction of the fuel gauge and tank sender unit. Terminal 8 is connected to circuit ground and is permanently grounded to vehicle ground.

The above is but a description of a preferred embodiment of the disclosed device. Of course, it is to be understood as not limiting the scope of the present invention as defined by the appended Claims.

The above describes a preferred embodiment of the present invention. Modification to the above can be made which will still fall within the breadth of the appended Claims. Inter alia, for example, the means for measuring the time delay can be effected by a counter which counts the elapsed cycles of the oscillator. When a predetermined count is reached, proportional to the desired delay, the cutout mechanism can be activated as described above.

Also, additional alarm devices can be employed which are connected in series with the relay contact normally closed to the relay pole when the relay is de-energized. This, too, will be activated at the end of the delay providing further indication of the low fuel condition.

Further modifications will become apparent, and those described herein, again, cannot be construed to be limitations on the breadth of the claims as set forth hereinafter.

What is claimed is:

1. A fuel level monitoring and engine control device for use with an engine having an electrical ignition system including an electrical ignition switch and power source, a starter system, a fuel supply tank and an electrically operated fuel gauge system, including a fuel sending unit and a fuel gauge interconnected electrically and to the power source, whereby a first signal voltage is generated to indicate the quantity of fuel in said fuel tank, said device serving to shut down the engine when the fuel supply in said tank reaches a predetermined low level but before said fuel supply is exhausted, said device comprising:

first circuit means including voltage sensing means connected to the junction of the fuel sending unit and the fuel gauge of said electrically operated fuel gauge system, whereby said voltage sensing means changes state when the first signal voltage reaches a predetermined value indicating the predetermined low level of fuel in said supply tank;

timing means electrically connected to the output of said voltage sensing means, for timing the elapsed period from when said voltage sensing means changes state at said predetermined low level of fuel until a predetermined elapsed time has expired;

means electrically interconnected between said timing means and said electrical ignition and or said starter system, whereby said electrical ignition and or said starter system is rendered inoperative at the end of said predetermined elapsed time; and lockout circuit means electrically connected to said timing means such that for a fuel condition below said predetermined low level existing while said engine is shut down, when said electrical ignition switch is closed, said timing means responds electrically such that said electrical ignition and or starter is rendered inoperative.

2. The device claimed in claim 1 wherein said first circuit means further includes pulsating warning means electrically connected to the output of said voltage sensing means, said warning means enabled when said voltage sensing means changes to the state indicating low fuel level, said warning means providing an intermittent warning signal(s) when it is enabled.

3. The device claimed in claim 2 wherein said pulsating warning means includes an oscillator electrically connected to said voltage sensing means, said oscillator gated on when voltage sensing means changes to the state indicating low fuel level.

4. The device claimed in either claim 2 or 3 wherein said first circuit means further includes means electrically connecting said timing means to said warning means, whereby said warning signal is forced to be continuous at the end of said predetermined elapsed time.

5. The device claimed in claim 4 wherein said voltage sensing means changes to a second state when said first signal voltage reaches a second predetermined value proportional to a second predetermined level of fuel which is higher than said predetermined low level of fuel, said lockout means and said timing means, rendered inoperative when said voltage sensing means is at said second state.

6. The device claimed in claim 5 wherein said lockout circuit means includes means connected in circuit for enabling said warning signal for a brief predetermined time at engine start up, when the fuel level is at or above said second predetermined level, whereby said warning signal is determined as operating.

7. The device claimed in claim 6 wherein said voltage sensing means includes circuit means for minimizing the possibility that sloshing fuel in said fuel tank will result in said voltage sensing means changing state.

8. The device claimed in claim 4 wherein said voltage sensing means further includes circuit means for adapting said device to either a fuel gauge system wherein an increasing voltage is indicative of a decreasing fuel level or a fuel gauge system wherein a decreasing voltage is indicative of a decreasing fuel level.

* * * * *